April 30, 1968 E. L. SWARTZ 3,380,655
FLUERIC BINARY ADDER
Filed Oct. 12, 1966 5 Sheets-Sheet 1

INVENTOR
ELMER L. SWARTZ
By Harry M. Saragovitz,
Edward J. Kelly, Herbert Berl
& J. D. Edgerton INVENTOR,
ELMER L. SWARTZ
By Harry M. Saragovitz
Edward J. Kelly, Herbert Berl
& J. D. Edgerton

FLUERIC BINARY ADDER

Filed Oct. 12, 1966 5 Sheets-Sheet 3

INVENTOR,
ELMER L. SWARTZ

By Harry M. Saragovitz,
Edward J. Kelly, Herbert Berl
& J. D. Edgerton

FLUERIC BINARY ADDER

INVENTOR,
ELMER L. SWARTZ
By Harry M. Saragovitz, Edward J. Kelly, Herbert Berl & J. D. Edgerton April 30, 1968 E. L. SWARTZ 3,380,655

FLUERIC BINARY ADDER

Filed Oct. 12, 1966 5 Sheets-Sheet 5

INVENTOR,
ELMER L. SWARTZ

By Harry M. Saragovitz, Edward J. Kelly, Herbert Berl & J. D. Edgerton

United States Patent Office 3,380,655

Patented Apr. 30, 1968

3,380,655

FLUERIC BINARY ADDER

Elmer L. Swartz, Falls Church, Va., assignor to the United States of America as represented by the Secretary of the Army Filed Oct. 12, 1966, Ser. No. 587,376
3 Claims. (Cl. 235—201)

ABSTRACT OF THE DISCLOSURE

A flueric binary adder comprising a plurality of binary registers adapted to receive in parallel bits of binary information and yield a readout of the total. Each binary register includes a self-biased fluid amplifier which upon receiving a binary input diverts flow from the output or "zero" channel to which the amplifier is biased to a "one" output channel. Flow in the "one" output channel of the self-biased amplifier operates a bistable circuit yielding a binary readout. Should a subsequent input be received in the register unit, flow from the self-biased amplifier and the bistable circuit will coincide to produce a carry pulse from an AND circuit to operate a succeeding binary register.

This invention relates to a fluid operated device, and in particular to a pure fluid amplifier circuit that operates as a binary adder.

A pure fluid amplifier is a device having no moving parts for controlling the passage of fluid therein. Pure fluid amplifiers have the potential for widespread use in the fields of fluid power and fluid control as they may be employed as digital and analog computing elements among their other uses. Principal advantages of pure fluid amplifiers are their inherent reliability, which is a result of their having no moving parts, their low cost, and their ease of manufacture. Pure fluid amplifiers can be made from any nonporous material that has structural rigidity.

One of the basic types of pure fluid amplifiers is the boundary layer type wherein a primary fluid flow is deflected by the interaction of a control fluid flow and the sidewalls of an interaction chamber which are so shaped that the primary fluid flow attaches to one or the other of the sidewalls but not both sidewalls simultaneously. The reason the fluid stays attached to a sidewall is that the primary fluid flowing past the sidewall entrains the fluid between the primary flow and the sidewall creating a lower pressure region, thus attracting the flow to the sidewall. Sidewall attachment of the primary flow may be switched by directing a control flow between the primary flow and the sidewall to which the primary flow is attached. This type of pure fluid amplifier is bistable, and is therefore suited to digital computer functions.

This invention utilizes pure fluid bistable elements in a fluid circuit which is designed to perform binary addition.

It is therefore an object of this invention to employ pure fluid devices working on the digital principle to produce a pure fluid binary adding device.

Another object of the present invention is to provide a pure fluid circuit that will receive and add a series of binary numbers.

Still another object of the present invention is to provide a pure fluid binary adder which gives a readout which is the sum of a binary input.

A further object is to provide a pure fluid binary adder having a running total of the sum of the binary inputs.

The specific nature of the invention, as well as other objects, uses and advantages thereof, will clearly appear from the following description and from the accompanying drawing in which.

Figure 1:
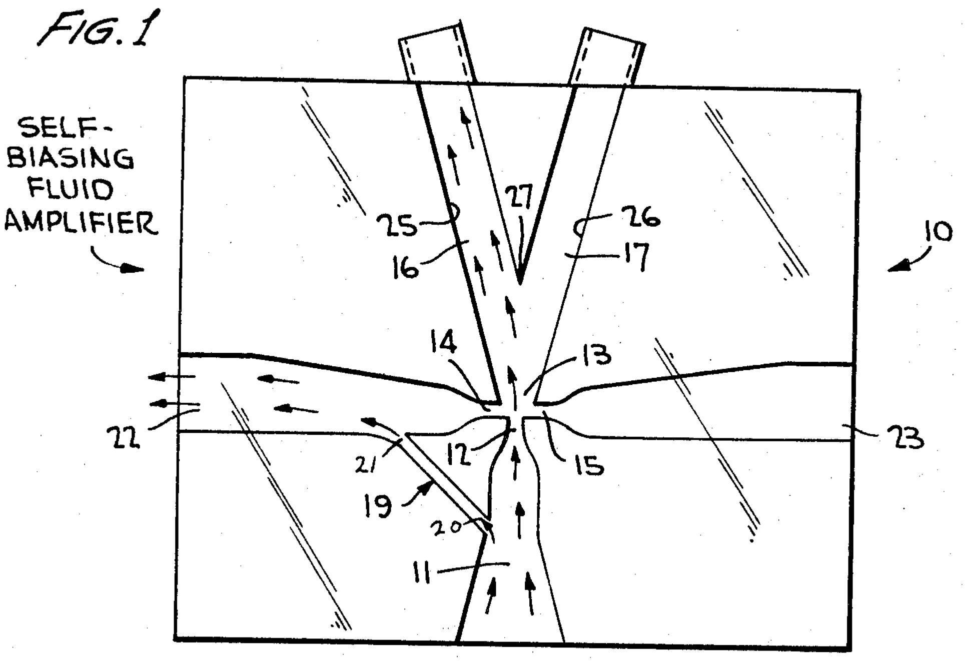
FIGURE 1 is a schematic of a self-biasing fluid amplifier which is a component of the present invention.

In FIGURE 1 self-biasing amplifier 10 receives a power source from inlet conduit 11 and via nozzle 12 directs the fluid into interaction chamber 13. Control nozzles 14, 15 are adapted to direct the fluid issuing from nozzle 12 into either the left outlet passage 16 or the right outlet passage 17. The outlet passages are formed by sidewalls 25, 26 and splitter 27, respectively. Communicating with inlet conduit 11 is port 20 which communicates with biasing slot 19 which communicates with port 21 which leads to left control conduit 22. A right control conduit 23 communicates with right control nozzle 15.

Figure 2:
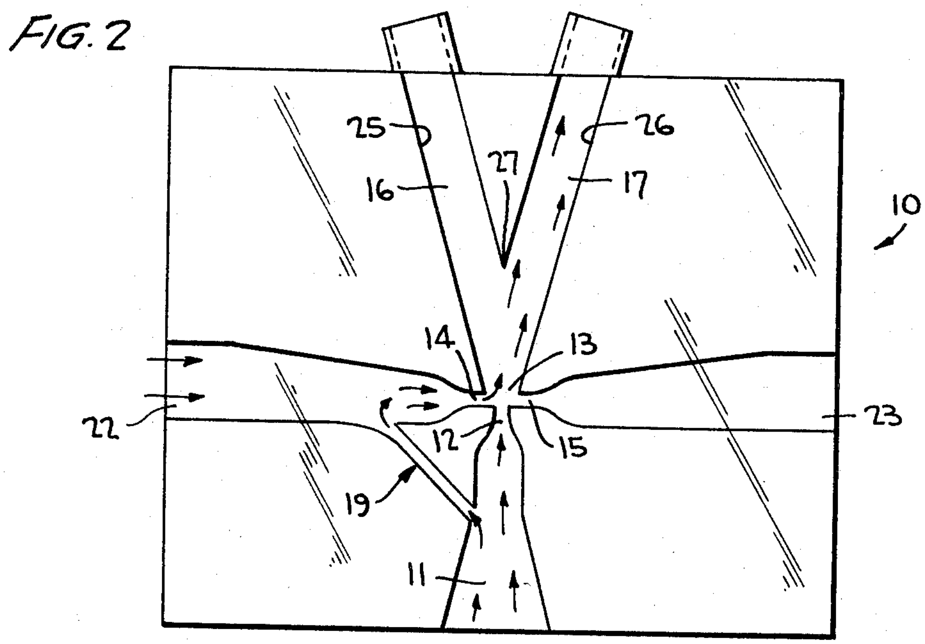
FIGURE 2 illustrates the self-biasing fluid amplifier of FIGURE 1 receiving a signal.

Amplifier 10 normally receives a power supply in conduit 11. Most of the fluid received therein will be directed out nozzle 12 as illustrated in FIGURE 1. However, some of the fluid will go into port 20, through bias slot 19 and port 21, and out left control conduit 22. The left control conduit normally communicates with atmosphere and thus provides a pressure sink. Flow out conduit 22 will entrain the power fluid in the region of left control nozzle 14 which will create a low pressure region adjacent said nozzle and because of this low pressure region the fluid issuing from nozzle 12 will attach to the left sidewall 25 and issue from outlet passage 16. Thus it can be seen that for no signals received by control conduits 22 and 23 the power stream will be biased to left outlet passage 16. It is anticipated that two types of signals could be received by the left control conduit. One type of signal would result from blocking the communication of conduit 22 to the atmosphere. This would force the fluid from bias slot 19 into left control nozzle 14 which would deflect the power fluid from nozzle 12 to the right outlet passage 17. The other type of signal would consist of a positive pressure signal applied to the left control conduit 22 which would likewise direct power fluid from nozzle 12 to the right outlet passage 17 and is illustrated in FIGURE 2. During the above two sequences of operation it is envisioned that the right control conduit 23 will be open to atmosphere. If, while conduit 22 is open, conduit 23 is blocked from communicating with the atmosphere, the fluid from nozzle 12 will issue from right outlet 17. This is because when conduit 23 is blocked, the fluid from nozzle 13 flowing into outlet passage 16 will entrain fluid in the interaction chamber 13 adjacent nozzle 15 creating a low pressure region there. This will switch the fluid from the left outlet passage to the right outlet passage and when conduit 23 is no longer blocked the flow will again be in the left outlet passage because of the built-in bias.

Figure 3:
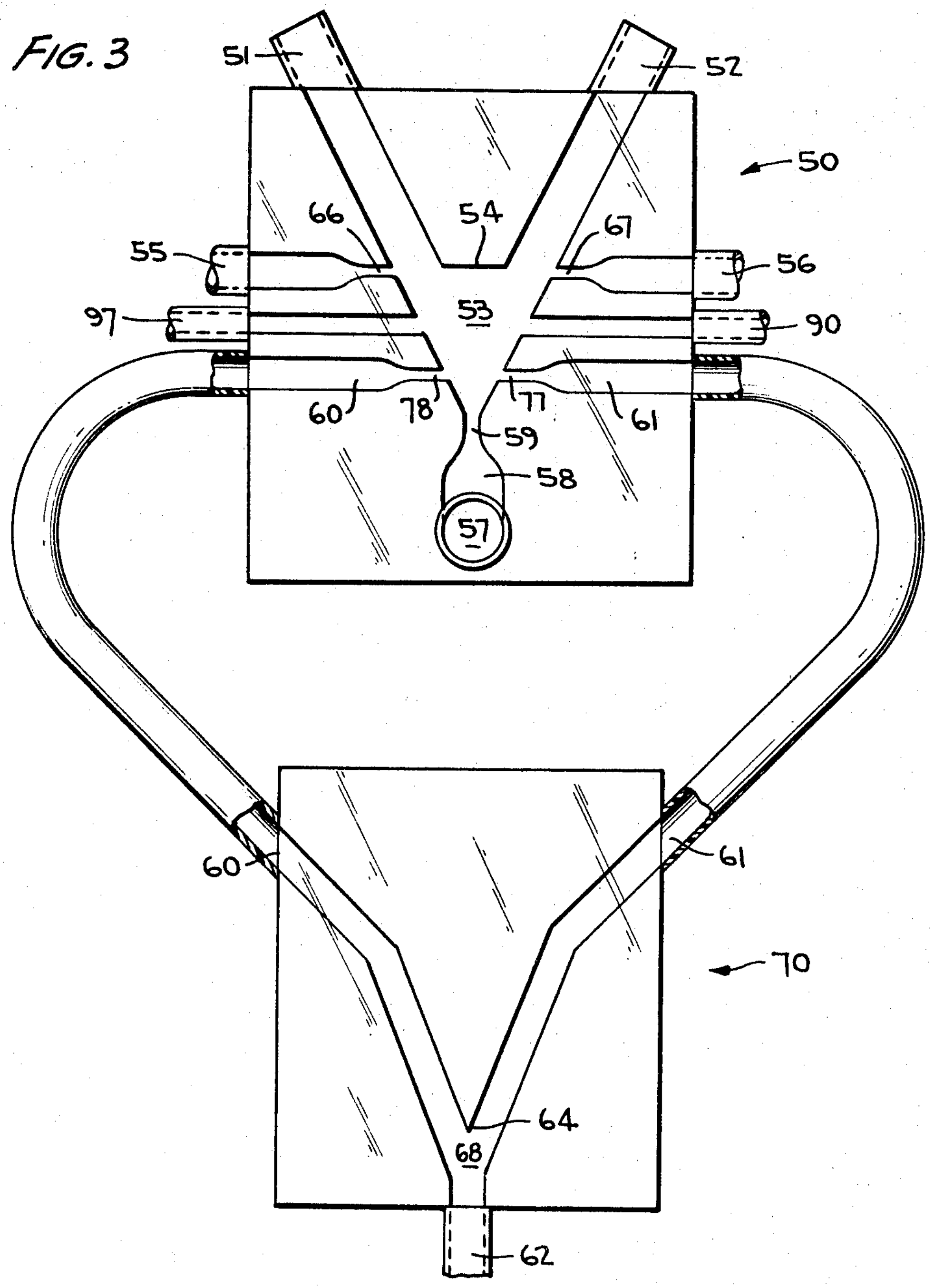
FIGURE 3 is a schematic of a T flip-flop which is used in the present invention.

FIGURE 3 illustrates a schematic of a T flip-flop which is to be used with the flueric binary adder. The T flip-flop consists of two parts, output section 50 and input section 70. Output 50 has an interaction chamber 53 which communicates with outlets 51 and 52 which are separated by divider 54. Adjacent interaction chamber 53 are atmospheric bleeds 55 and 56 which communicate with the interaction chamber through nozzles 66 and 67 respectively. Also communicating with interaction chamber 53 are feedback legs 60 and 61 which are just downstream of main jet nozzle 59 which communicates with the power source 57 by conduit 58. A second set of control conduits 90 and 97 are present adjacent the interaction chamber 53. A secondary fluid signal to either conduit 90 or 97 will shift the power jet from the outlet adjacent to the secondary signal to the other outlet. The input section 70 has a supply pressure conduit 62 which is anticipated to be a fluid signal source. Interaction chamber 68 is adjacent divider 64 which is communicated to legs 60 and 61.

If a signal is received by conduit 62, and assuming it enters leg 60, the fluid from nozzle 59 will be directed to outlet 52. As the power fluid from source 57 flows past leg 61 to outlet 52 it will entrain the fluid in leg 61 creating a low pressure region in the leg. If the signal to conduit 62 is withdrawn the power fluid from nozzle 59 will continue to direct fluid to outlet 52 since the fluid will attach to the sidewall adjacent the outlet. If a new signal is applied to conduit 62 the fluid will enter leg 61 since it will be at a lower pressure than leg 60 because of the entrainment of fluid in leg 61 by fluid flow adjacent nozzle 77. The fluid now in leg 61 will switch the power fluid from outlet 52 to outlet 51. It can be seen that the next signal to conduit 62 will direct fluid to leg 60 which will switch the fluid to outlet 52.

Figure 4:
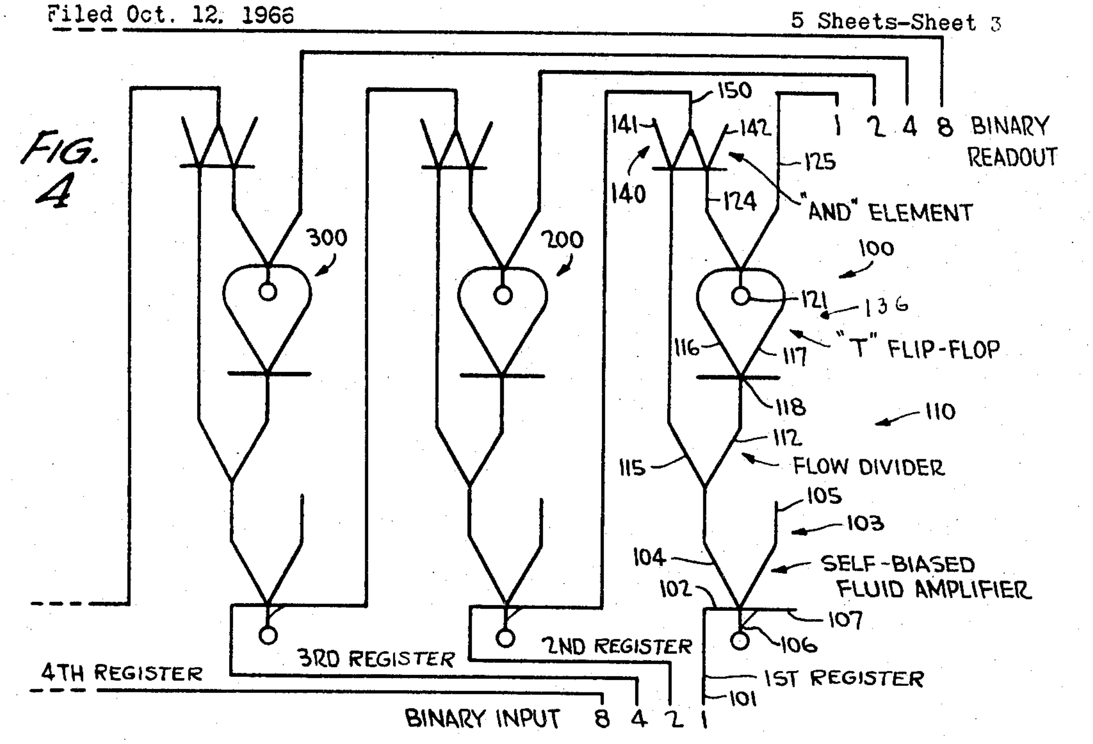
FIGURE 4 is a schematic of a flueric binary adder in accordance with my invention.

In FIGURE 4 the flueric binary adder consists of plural identical register units 100, 200, 300 . . . Each unit is identical to the other so a detailed description of one register unit will suffice to give a thorough understanding of my invention. All the identical elements of the register units will have the same last two digits preceded by the number of the register unit in order to facilitate ease of identification of the component elements. Register unit 100 which corresponds to a binary readout of the number ONE has a conduit 101 which receives a binary input of ONE. Conduit 101 leads to left control 102 of a self-biasing fluid amplifier 103 which is schematically shown and labelled. Self-biasing amplifier 103 is biased to right outlet 105 which leads to atmosphere. Power fluid for the unit is supplied to conduit 106 and conduit 104 leads to flow divider 110 which divides the flow it receives into conduits 115 and 112. Conduit 112 leads to a T flip-flop 136 which is schematically shown and labelled. The T flip-flop has legs 116 and 117 which are in communication with conduit 112 at junction 118 as schematically shown. Legs 116 and 117 impinge and direct fluid on power jet 121 into either of the two outlets, 124 and 125. Conduit 125 leads to a binary readout which indicates the total of the inputs and is labelled, "Binary Readout." The binary readout comprises any fluid detecting means such as a simple pressure gage and is present in each register unit. Since conduit 125 is in register unit 100, which represents the binary input number ONE, it leads to the binary readout labelled 1. Conduit 115 leads to an AND logic device 140 which is schematically shown and labelled and has outlets 141 and 142 which lead to the atmosphere. The AND logic device has output 150 which leads to the next register unit 200. The AND device operates as a carry-over on receiving signals from the preceding register unit. One possible embodiment of an AND device would be that of my copending case Ser. No. 466,867 filed June 24, 1965 for a Fluid Logic Element. Each register unit has a binary input. For unit 100 the binary input is ONE, for unit 200 the binary input is TWO, for unit 300 the binary input is FOUR, etc., and is labelled "Binary Input." Each register unit has a T flip-flop which leads to a binary readout from its right outlet. This can be seen in the portion labelled "Binary Readout" where unit 100 has a binary readout of ONE, unit 200 has a binary readout of TWO, unit 300 has a binary readout of FOUR, etc.

Figure 8:
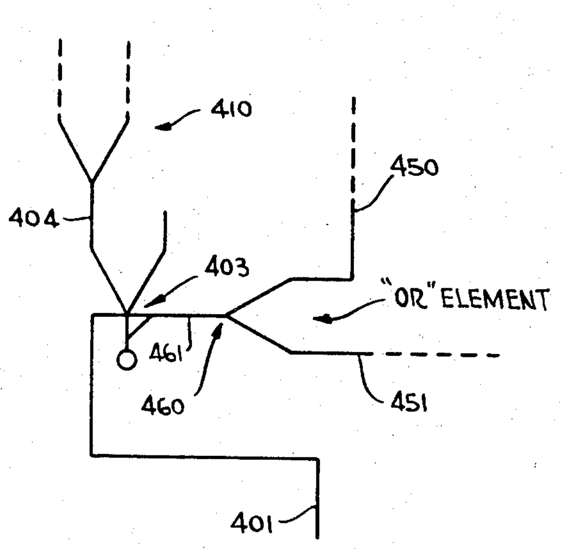
FIGURE 8 is a schematic of alternate input means for the flueric binary adder.

FIGURE 8 shows an alternate input means and consists of a self-biased amplifier 403 leading to a flow divider 410 via conduit 404. The binary input 401 is to apply a binary number to the left control of the self-biased fluid amplifier. Conduit 450 is the carryover conduit of a preceding unit and is joined to OR element 460. The OR element is contemplated to be one of the well known fluid OR elements and directs fluid into the right control of the self-biased fluid amplifier. Conduit 451 leads to an alternate input means and either carryover 450 or alternate input 451 can direct fluid to conduit 461, since 460 is an OR element. Thus, the alternate input is a means of putting a binary number into the system which is indicative of the binary output of the magnitude of the binary number of the preceding register without using the preceding unit.

Figure 5:
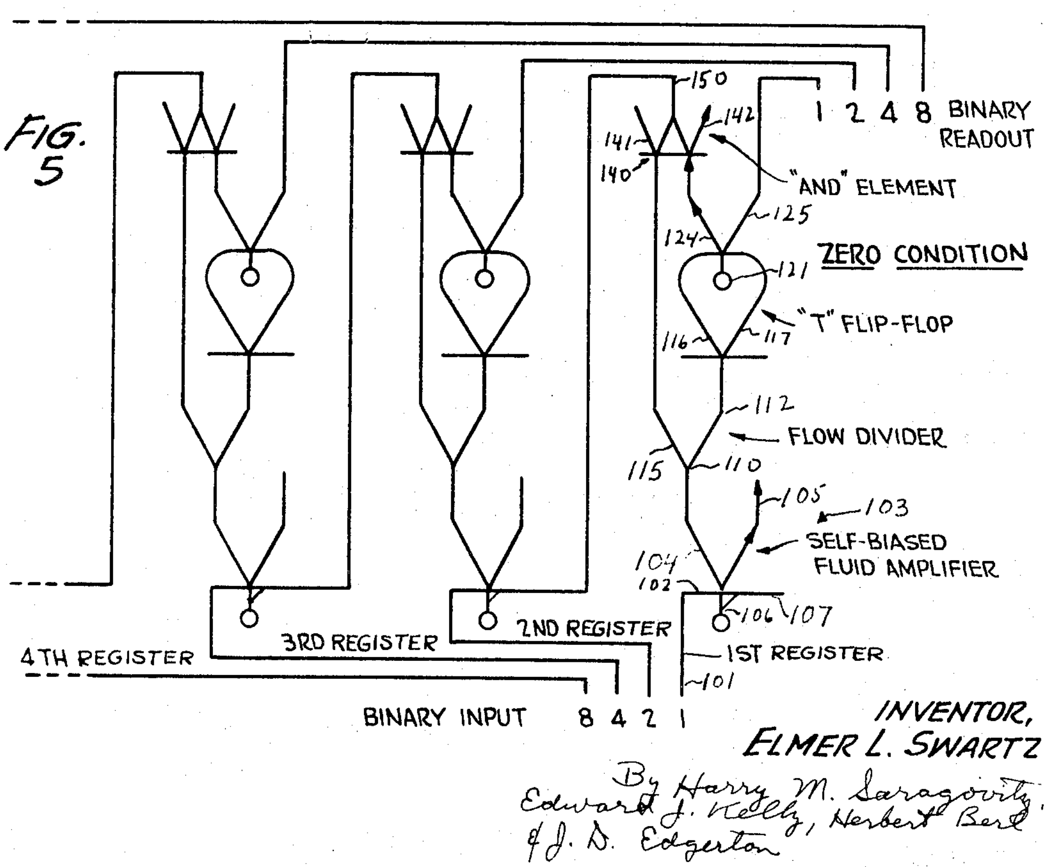
FIGURE 5 is a schematic of the flueric binary adder of FIGURE 4 with a zero signal.

FIGURE 5 shows the flueric binary adder with a zero input and the arrows thereon show fluid flow. A description of flow in register 100 will suffice to give an understanding of all the units since these are identical to each other for the zero condition. The flow from power conduit 106 is exhausted to atmosphere, as seen by the arrows, via conduit 105 since the self-biased fluid amplifier is biased to the right. The fluid in T flip-flop 136 enters conduit 124 leading to AND unit 140. Since conduit 115 does not receive fluid from the self-biased fluid amplifier, the AND unit will discharge the fluid from conduit 124 to atmosphere via conduit 142. For AND unit 140 to discharge fluid to carry-over conduit 150 it is necessary for conduits 115 and 124 to direct fluid to the unit. The T flip-flop 136 directs fluid to outlet conduit 124 since this outlet has less impedance in it than outlet 125 has because outlet 125 leads to the binary readout which has a fluid operated device in it impeding the flow therein. To help insure initial flow out conduit 124 a resistor could be placed in conduit 125. The binary readout will read zero since no fluid reaches it from any register unit and thus is inactive.

Figure 6:
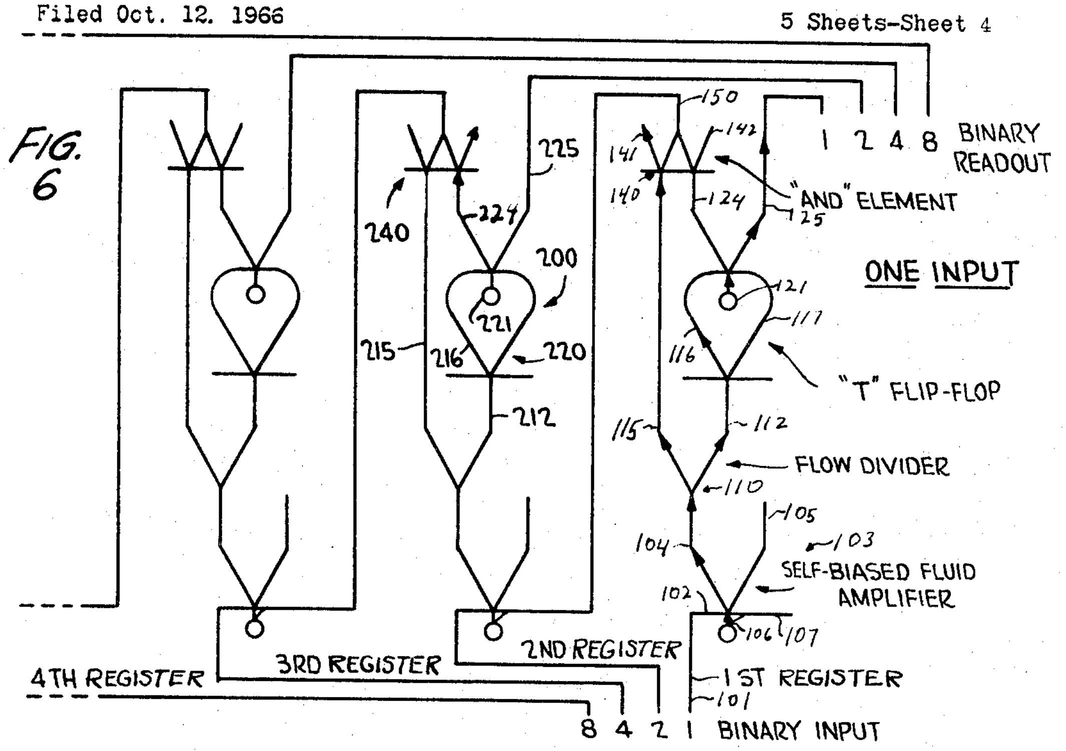
FIGURE 6 is a schematic of the flueric binary adder with a ONE input.

If it is desired to add ONE to the unit a binary input is added which corresponds to ONE. This would mean either closing off conduit 101 or applying a fluid signal to conduit 107 which is the right control conduit of self-biased amplifier 103. As seen in FIGURE 6, and tracing the flow thereon by the arrows, the fluid from self-biased amplifier 103 will flow out conduit 104 to flow divider 110. The flow divider will direct fluid via conduit 115 to the AND unit 140 and to the T flip-flop 136 via conduit 112. Tracing the flow along conduit 112 to the T flip-flop the fluid will flow initially into leg 116. In the previous operation the fluid from the T flip-flop was directed to conduit 124. This created a low pressure region in leg 116 as the fluid from power supply 121 was directed to the left outlet and entrained fluid in leg 116 and since leg 116 is at a lower pressure than leg 117 the flow from conduit 112 will enter leg 116 directing fluid from power supply 121 to conduit 125 which will give a readout corresponding to the input of ONE. Since the signal for the input of ONE is temporary in time, the self-biased fluid amplifier will, after removal of the input signal, discharge to atmosphere via conduit 105 because of the bias of the amplifier. The T flip-flop will continue to discharge to conduit 125 to maintain a continuous readout of one. During this time fluid in conduit 115 leading to AND element 140 will discharge to atmosphere via 141 since the AND element will not receive a signal from the T flip-flop.

Figure 7:
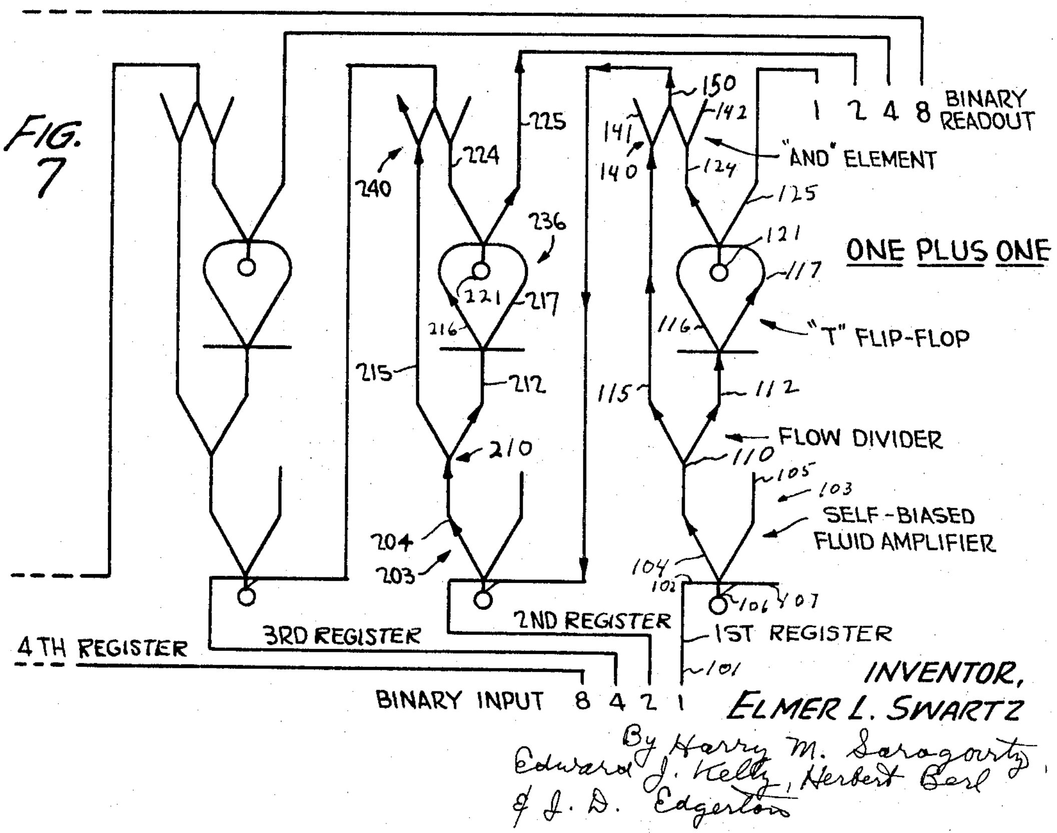
FIGURE 7 is a schematic of the flueric binary adder with a ONE plus ONE input.

If it is desired to add ONE to system, in addition to the previous ONE placed in the system, then a signal is applied to the binary input corresponding to ONE which is conduit 101. As explained above, this will shift the self-biased fluid amplifier output to conduit 104 and flow divider 110, and as seen in FIGURE 7 which shows the flow path for the entire system, conduit 104 communicates with flow divider 110 which will divide the flow to conduits 115 and 112, respectively. The flow to T flip-flop 136 via conduit 112 will enter leg 117 of the flip-flop. This is because in the previous state the power from source 121 was directed out conduit 125 which entrained flow in leg 117 creating a low pressure region there which will attract fluid from conduit 112. The fluid in leg 117 will direct flow from power source 121 to conduit 124 of AND element 140, which because it will receive a signal from conduit 115 simultaneously will direct fluid to carry over line 150 since the requisite two inputs will be received by the AND element. It is noted that since no flow from T flip-flop 136 is directed to conduit 125 there will be no readout of ONE in the binary readout. The fluid in carry-over line 150 will direct the flow in the self-biased fluid amplifier 203 via conduit 204 to flow divider 210. The flow divider 210 will direct fluid to T flip-flop 236 by conduit 212 and to AND element 240 by conduit 215. The fluid received by T flip-flop 236 enters leg 216 because in the inactive state of adder unit 200, power source 221 issued into conduit 224 since it has a lower impedance than conduit 225 which has a fluid activated readout device in it. The fluid in conduit 224 entrains fluid in leg 216 creating a low pressure region there which will attract the flow from conduit 212. The flow in leg 216 directs the power fluid in 221 to conduit 225 which leads to the binary readout and gives a readout of TWO which corresponds to one plus one. The flow in conduit 215 will go to AND device 240 where it will be discharged to atmosphere since there is no signal from conduit 224 which is necessary to operate the AND device to direct fluid to the next register.

It is believed that other additional operations will be apparent to those skilled in the art. It is noted that if it were desired to add a TWO to the system this would be done at the binary input of the second register and for a FOUR to the binary input of the third register. As many registers are envisioned as would be necessary for the magnitude of the arithmetic. In the case where therre is a plurality of inputs on the several input lines each register will have to respond to input pulses arriving over its input line and to carry pulses from a preceding register. Therefore, as is well known to those skilled in the art, the adder will have to be designed so that input pulses to the self-biased amplifier will be of a shorter duration than the time required for a carry pulse to be generated and transmitted to a succeeding register in order to permit the self-biased amplifier to reset prior to the arrival of the carry pulse.

If it is desired to zero the system the easiest method of doing this is to turn the supply pressure off temporarily.

Figure 9:
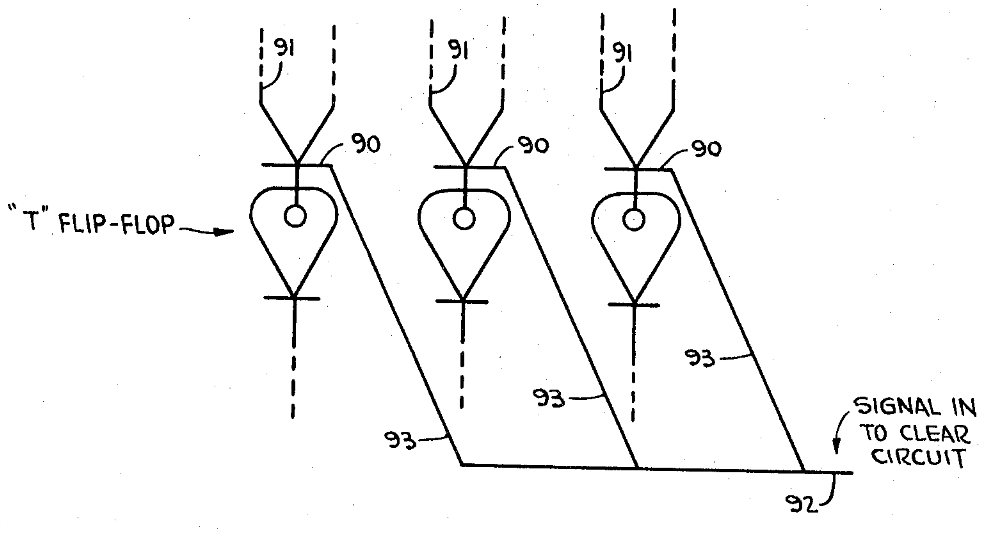
FIGURE 9 illustrates zeroing means for the flueric binary adder.

Another method of zeroing the circuit is shown in FIGURE 9. The zeroing circuit of FIGURE 9 involves a second set controls 90 on the T flip-flop (FIGURE 3) to direct the fluid therefrom to the left outlet which would lead to an AND unit. The fluid in the AND unit would discharge to atmosphere since the self-biased amplifier unit also having a conduit leading to the AND unit would be discharging to atmosphere since it would not be receiving a signal and an AND unit will discharge to atmosphere if it has only one fluid output. The means to direct fluid to the second set of controls of the T flip-flop to zero the unit are a common source of pressure 92 having branch conduits 93 leading to the second set of controls 90. An application of pressure to line 92 will therefore instantly zero the circuits since it will remove any pressure from the binary readout giving a zero total.

It will be apparent that the embodiments shown are only exemplary and that the various modifications can be made in construction and arrangement within the scope of the invention as defined in the appended claims.

I claim as my invention:

1. A flueric binary adder having a plurality of registers adapted to receive binary information in parallel and interconnected so that a carry signal may be propagated from each preceding to each succeeding register, each register comprising:

(a) an input means;

(b) a self-biased fluid amplifier having a zero output channel and a one output channel and connected to said input means to receive signals therefrom, said amplifier being biased, in the absence of an input, to maintain flow through said zero output channel to the atmosphere and to divert flow to said one output channel upon receiving an input pulse and to revert flow to said zero output channel upon removal of said input pulse;

(c) a bistable T flip-flop having an input means, a zero output channel and a one output channel, said input means of said T flip-flop being connected to said one output channel of said bistable amplifier, said T flip-flop being capable of diverting flow from one of its output channels to the other upon receipt of a signal from said self-biased amplifier;

(d) a fluid AND gate means having a first input connected to said one output channel of said self-biased amplifier and a second input connected to said zero output channel of said bistable element for producing an output pulse to be applied to a succeeding register upon the simultaneous appearance of signals in each of said inputs of said AND gate; and (e) a readout means connected to said one output channel of said bistable element for producing an indication when the register is in a binary one state.

2. The flueric binary adder of claim 1 including additionally a zero reset means communicating a pressure signal to said bistable element for causing fluid flow to be directed out of said zero channel of said bistable element.

3. The flueric binary adder of claim 1 including additionally, as an auxiliary input means, a fluid OR element connected to an input of said self-biased fluid amplifier.

References Cited

UNITED STATES PATENTS

| | | | |
|---|---|---|---|
| 3,057,551 | 10/1962 | Etter | 235—201 |
| 3,122,313 | 2/1964 | Glattli | 235—201 |
| 3,128,040 | 5/1964 | Norwood | 235—201 |
| 3,190,554 | 6/1965 | Gehring et al. | 235—201 |

RICHARD B. WILKINSON, *Primary Examiner.*

LAWRENCE R. FRANKLIN, *Assistant Examiner.*